(12) United States Patent
Chen

(10) Patent No.: US 6,827,439 B1
(45) Date of Patent: Dec. 7, 2004

(54) STRUCTURE OF THE RIMLESS EYEGLASSES

(76) Inventor: Lee-Tsung Chen, P.O. Box 697, Feng-Yuan City, Taichung Hsien (TW), 420

(*) Notice: Subject to any disclaimer, the term of this patent is extended or adjusted under 35 U.S.C. 154(b) by 0 days.

(21) Appl. No.: 10/660,502

(22) Filed: Sep. 12, 2003

(51) Int. Cl.[7] ............................................. G02C 1/02
(52) U.S. Cl. ...................................... 351/110; 351/140
(58) Field of Search ................................ 351/110, 140, 351/154

(56) References Cited

U.S. PATENT DOCUMENTS 6,523,952 B1 * 2/2003 Krumme ..................... 351/110

* cited by examiner

Primary Examiner—Huy Mai

(57) ABSTRACT

An improved structure of the rimless eyeglasses includes a pair of lenses each having a pair of connection pieces respectively stuck on the outer and inner edges. The connection pieces each has a sticky surface toward the lenses and pair of protrudent screw hole spacedly formed on outer surface. A bridge having a pair coupling plates at two end engaged with the protrudent screw holes of the connection pieces and secured by screws. A pair of L-shaped temples each has a coupling plate on the end of its transverse portion and engaged with the connection pieces on outer edge of the lenses and secured by screws. The character is that the connection pieces are removable and for adjusting the focus and the horizontal line of the eyeglasses in order to fit the eyes and the face of a wearer and saves the cost to buy a new one.

4 Claims, 7 Drawing Sheets

STRUCTURE OF THE RIMLESS EYEGLASSES

BACKGROUND OF THE INVENTION

The present invention relates to eyeglasses and more particularly to an improved structure of the rimless eyeglasses.

The eyeglasses is one of the popular personal articles. Those who are nearsightednesses and/or farsightednesses need to wear an eyeglasses for the distinguishment of the things in front of them. Especially for the formers who need to wear an eyeglasses all day before going to bed. That's why the manufacturers of the eyeglasses trend to develop an eyeglasses which is light-weight and convenient to wear. Generally, the eyeglasses can identified two type, the rimmed type and the rimless type. FIG. 1, shows a rimless type of the eyeglasses 10 which comprises two pieces of lens 11 connected each other by a bridge 12 with screws 15, and a pair of L-shaped temples 13 respective connected to the lens 11 by screws 14. This structure of the eyeglasses is characterized in light-weight and simplicity, but is unadjustable due to the fixed screw holes in the lens 11. If the wearer finds out that the eyeglasses does not fit to his face or that the focus of the lens does not coincide with his eyes, he can do nothing but buy a new one. This cost more for him.

SUMMARY OF THE PRESENT INVENTION

The present invention has a main object to provide an improved structure of the rimless eyeglasses which does not make screw holes in the lens but the bridge and temples are rapidly and stably secured to the lens.

Another object of the present invention is to provide an improved structure of the rimless eyeglasses in which the bridge and the temples movable to fit the face of the wearers.

Accordingly, the improved structure of the rimless eyeglasses of the present invention comprises generally two pieces of lens each of which has a pair of connection pieces respectively stuck on the outer and inner edges for coupling with a bridge and a pair temples. Since the connection pieces are movable to adjust the bridge and the temples to fit the face of the wearer, the wearer needs not to buy a new one.

The present invention will become more fully understood by reference to the following detailed description thereof when read in conjunction with the attached drawings.

DETAILED DESCRIPTION OF THE PREFERRED EMBODIMENT

Figure 1:
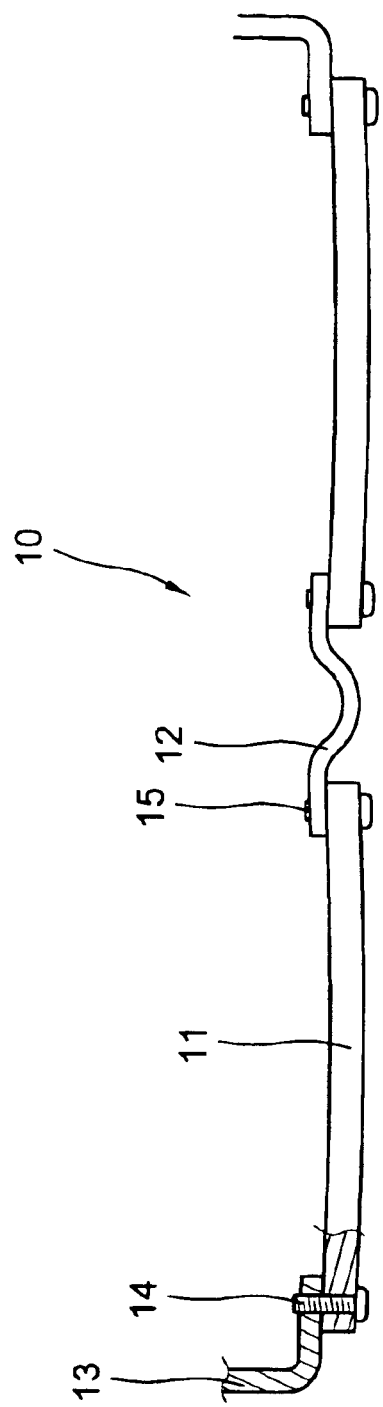
FIG. 1 is a top view of a rimless eyeglasses according to a prior art.
Figure 2:
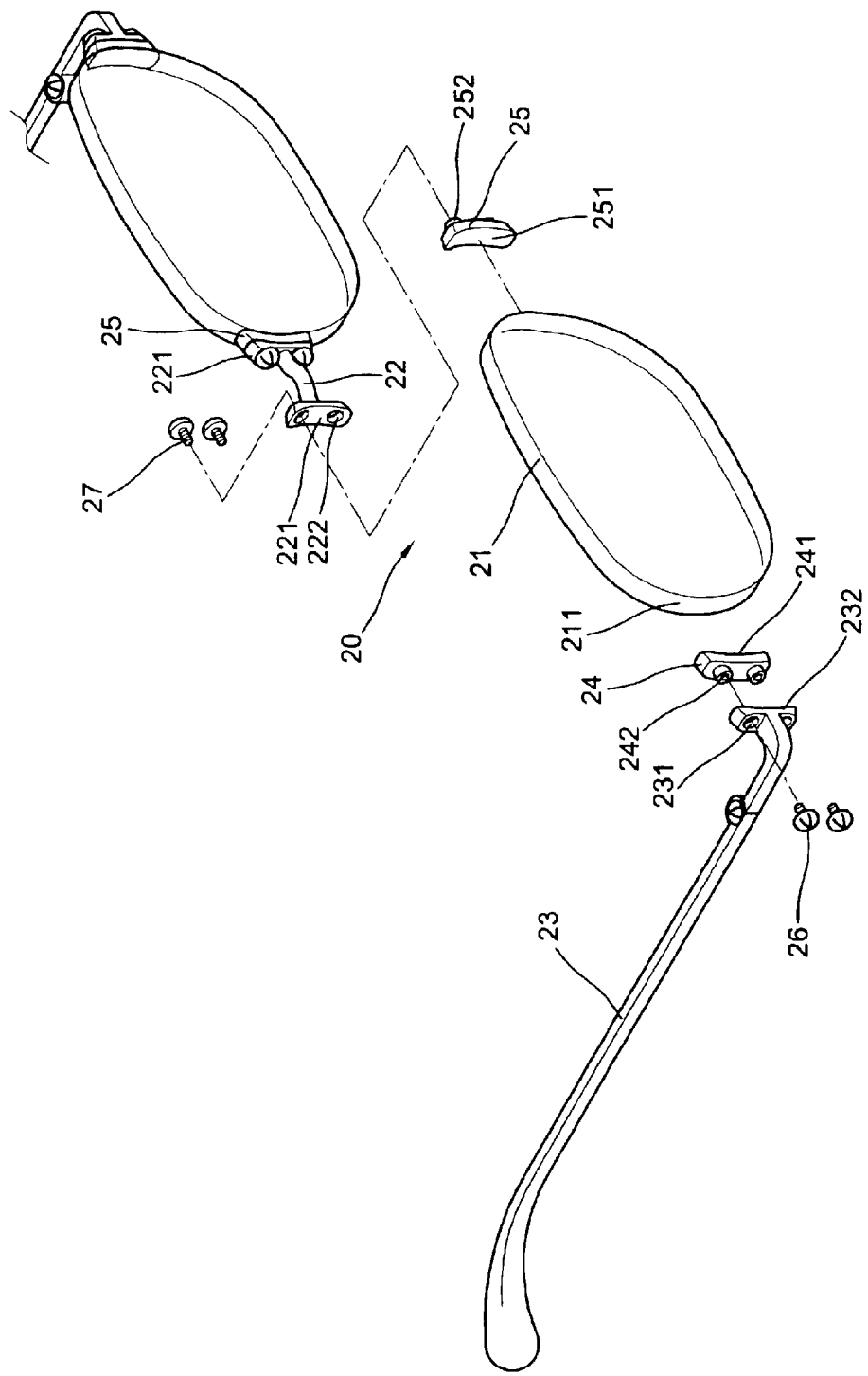
FIG. 2 is an exploded perspective view of a rimless eyeglasses of a first embodiment of the present invention.
Figure 3:
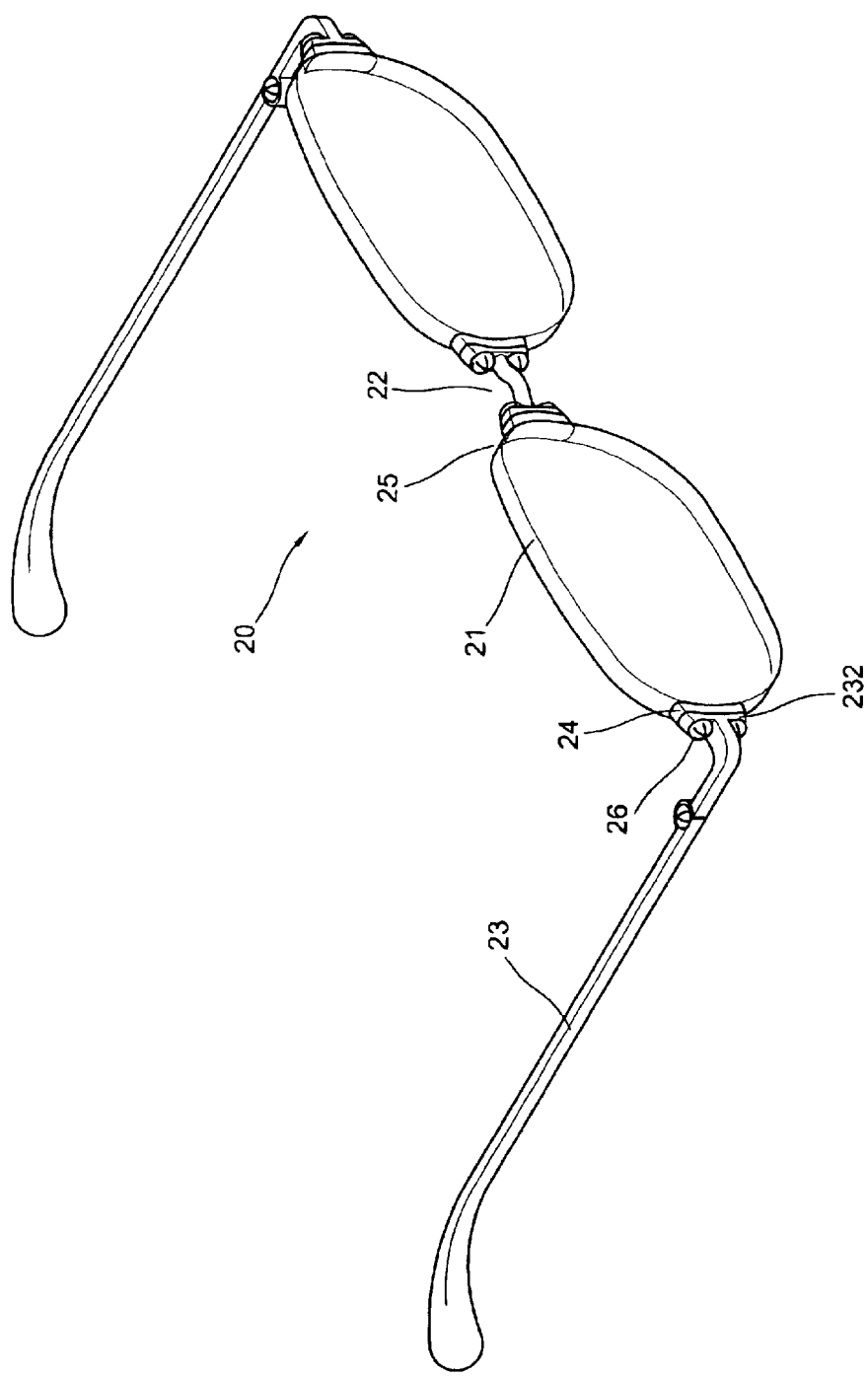
FIG. 3 is a perspective view of the assembly of FIG. 2.
Figure 4:
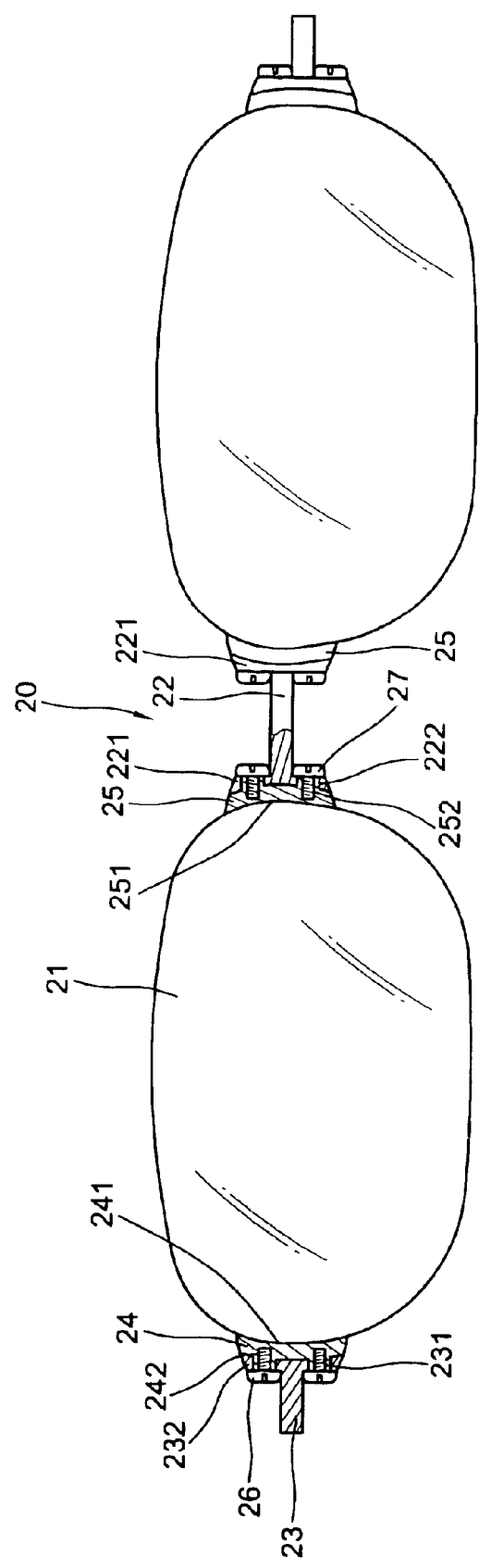
FIG. 4 is a sectional view to show the connection elements of the rimless eyeglasses of the first embodiment.

With reference to the drawings and initiated from FIGS. 2, 3 and 4, the first embodiment of the improved structure of the rimless eyeglasses 20 according to the present invention comprises generally two pieces of lens 21, a bridge 22 and a pair of roughly L-shaped temples 23. The lenses 21 each has an outer connection piece 24 stuck on an outer edge and an inner connection piece 25 stuck on an inner edge by adhesives. The connection pieces 24 and 25 each has a sticky surface 241 and 251 facing the lens 21 and a pair of protrudent screw holes 242 and 252 spacedly projected outward from the outer surface thereof. The bridge 22 has a pair of coupling plates 221 perpendicular to two ends. The coupling plates 221 each has a pair of dowel holes 222 spacedly formed and engageable with the protrudent screw holes 252 of the inner connection pieces 25. The temples 23 each has a coupling plate 231 perpendicular to the end of the transverse portion. The coupling plate 231 each has a pair of dowel holes 232 spacedly formed and engageable with the protrudent screw holes 242 of the outer connection pieces 24.

When assembling, first stick the connection pieces 24 and 25 on an appropriate outer and inner ledges of the lenses 21, then engage the dowel holes 222 of the coupling plates 221 of the bridge 22 with the protrudent screw holes 252 of the inner connection pieces 25 and secure by the screws 27 and then engage the dowel holes 232 of the coupling plates 231 of the temples 23 with the protrudent screw holes 242 of the outer connection pieces 24 and secure by screws 26. Therefore the rimless eyeglasses 20 of the first embodiment of the present invention is assembled (as shown in FIGS. 3 and 4).

If the wearer finds out that the eyeglasses 20 not fits his face or that the focus of the lenses 21 do not coinside with his eyes or that the horizontal line of the eyeglasses is incorrect, he may removes any of the connection pieces 24 and 25 with mechanical force and simultaneously rubs out the old adhesives both on the edge of the lens 21 and on the sticky surface of the connection piece 24 and 25. Then stick the connection piece 24 and 25 to a correct place on an edge of the lens 21 with new adhesives. When the eyeglass 20 bumps against something, it would not be broken because there is no any hole punched in the lenses 21. Normally, the bumping stress concentrates on the holes of the lenses 21.

Figure 5:
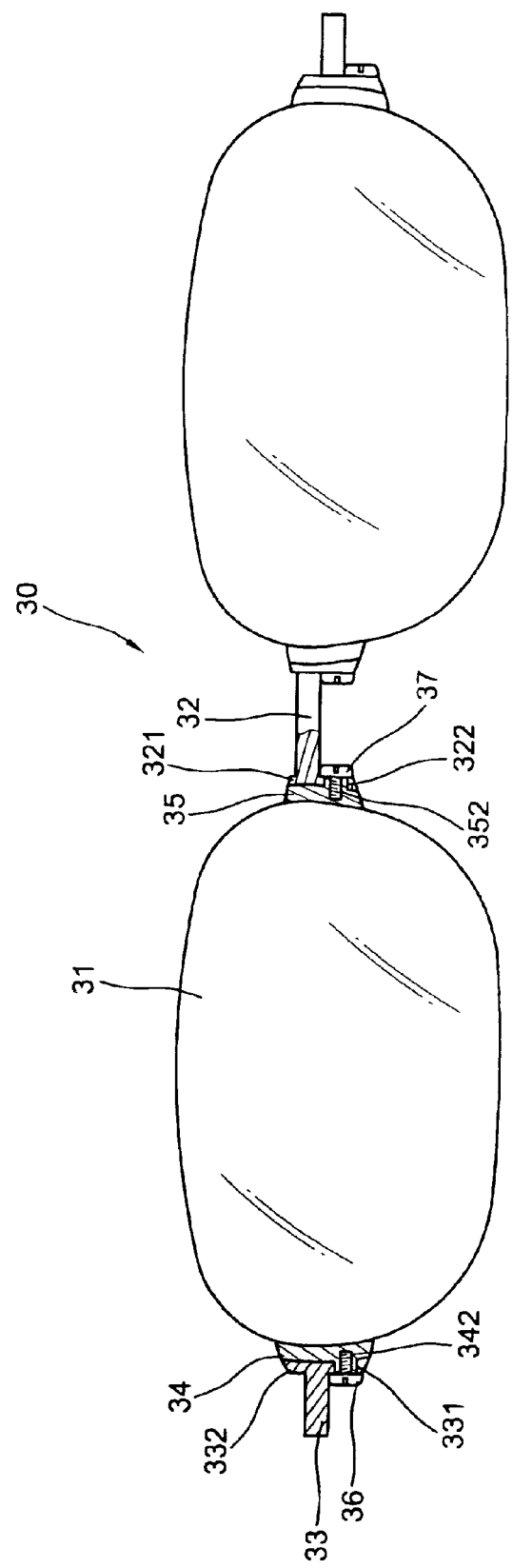
FIG. 5 is a sectional view to show the connection elements of the rimless eyeglasses of a second embodiment of the present invention.

FIG. 5 shows a second embodiment of the rimless eyeglasses 30 of the present invention. This rimless eyeglasses 30 also comprises a pair of lenses 31, an inverse U-shaped bridge 32 and a pair of roughly L-shaped temples 33. The lenses 31 each has a pair of connection pieces 34 and 35 stuck on their inner and outer edges respectively. Each of the connection pieces 34 and 35 has a protrudent screw hole 342 and 352 projected outward from a lower portion. The inverse U-shaped bridge 32 has a dowel hole 322 in each of the upright portions 321 and engage with the protrudent screw holes 352 and respectively secure by a pair of screws 37. The pair of L-shaped temples 33 each has a coupling plate 332 perpendicular to the end of the transverse portions and each of the coupling plates 332 has a dowel hole 331 in lower portion engaged with the protrudent screw holes 342 and secured by a pair of screws 36 respectively. This embodiment is functionally similar to the first embodiment.

Figure 6:
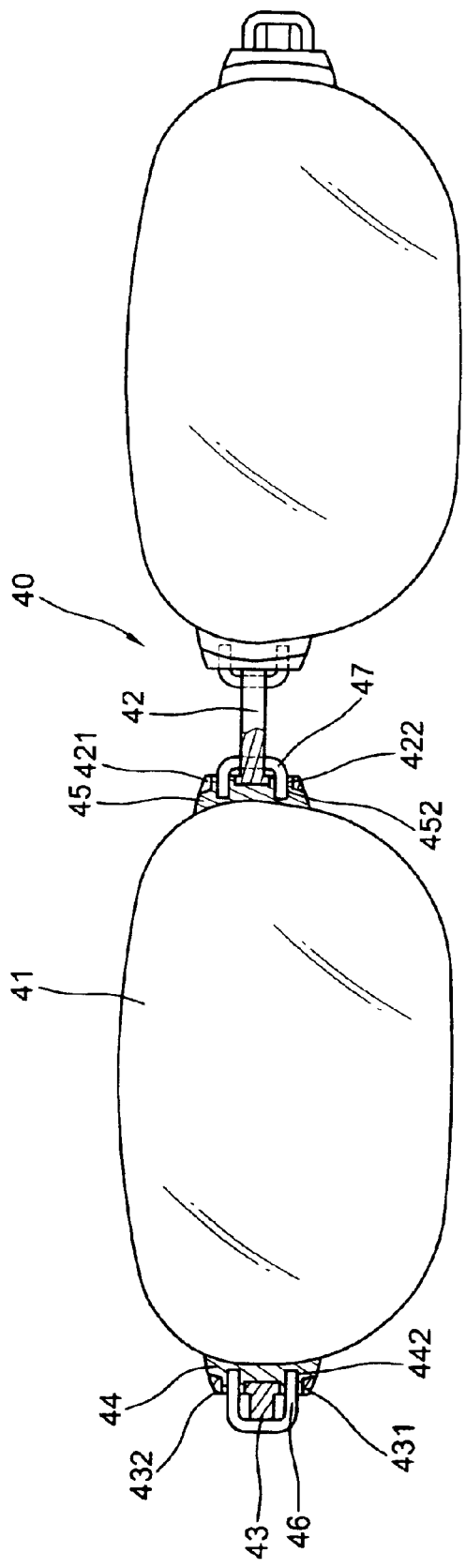
FIG. 6 is a sectional view to show the connection elements of the rimless eyeglasses of a third embodiment of the present invention.

FIG. 6 provides a third embodiment of the rimless eyeglasses 40 which comprises a pair of lenses 41, a bridge 42 and a pair of roughly L-shaped temples 43. Each of the lenses 41 has a pair of connection pieces 44 and 45 stuck on their lateral edges respectively and each of the connection pieces 44 and 45 has a pair of protrudent through holes spacedly projected outward from outer surface. The bridge 42 has a pair of coupling plates 421 perpendicular to its two ends respectively and each of the coupling plates 421 has pair of dowel holes 422 engaged with the protrudent through holes 452 of the connection pieces 45 and secured by a pair of U-shaped detents 47. The L-shaped temples 43 each has a coupling plate 431 perpendicular to the end of their transverse portions and each of the coupling plates 431 has a pair of dowel holes 432 engaged on the protrudent through holes 442 of the connection pieces 44 and secured by a pair of U-shaped detents 46. Glue may be applied on the transverse portions of the U-shaped detents 46 and 47 to ensure the stability of the eyeglasses 40.

Figure 7:
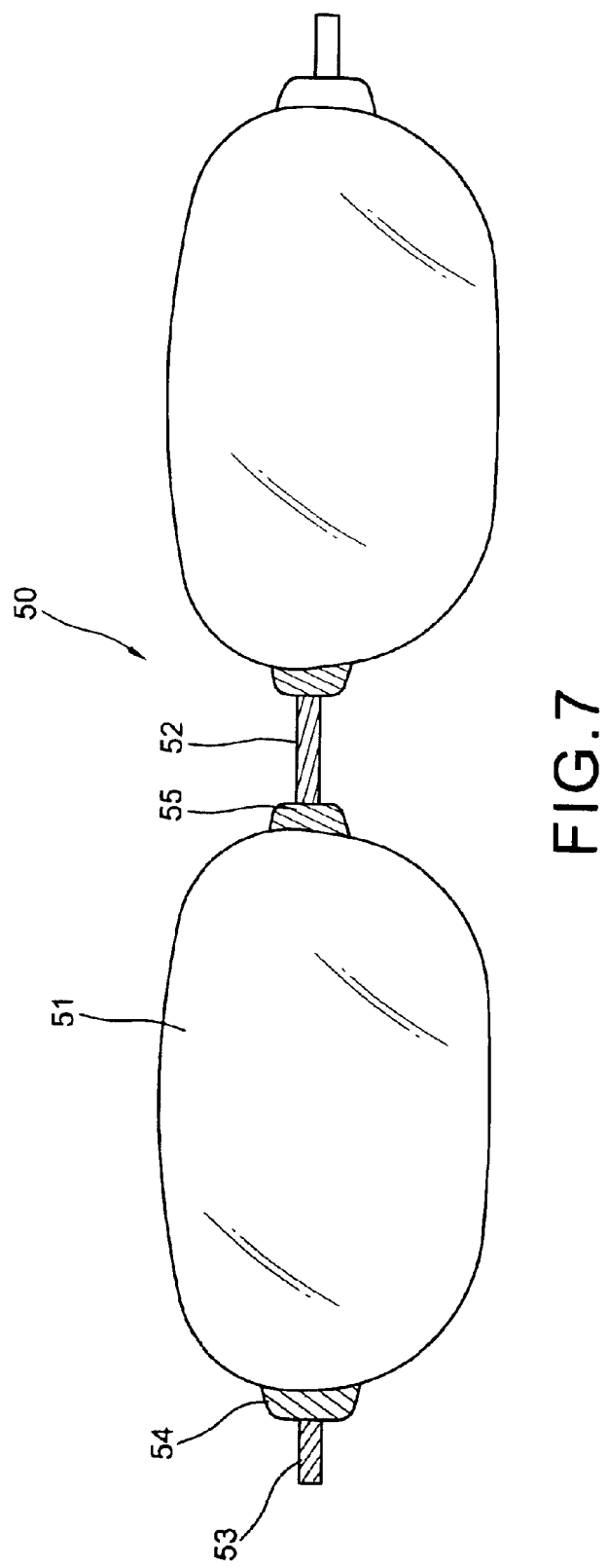
FIG. 7 is a sectional view to show the connection elements of the rimless eyeglasses of a fourth embodiment of the present invention.

FIG. 7 is a fourth embodiment of the rimless eyeglasses 50 which comprises a pair of lenses 51 connected by a bridge 52, and a pair of roughly L-shaped temples 53. The bridge 52 integrates with a pair of first connection pieces 55 perpendicular to two ends respectively and each has sticky surface directly stuck on an inner edge of the lenses 51 with adhesive. The temples 53 each has a second connection piece perpendicularly integrated with the end of its transverse portion. The second connection pieces 54 each has also a sticky surface directly stuck on an outer edge of the lenses 51. This embodiment is characterized in simplified structure but is functioned as that of the above embodiment.

Note that the specification relating to the above embodiment should be construed as an exemplary rather than as limitative of the present invention, with many variations and modifications being readily attainable by a person of average skill in the art without departing from the spirit or scope thereof as defined by the appended claims and their legal equivalents.

I claim:

1. An improved structure of the rimless eyeglasses comprising:

a pair of lenses each having a first connection piece stuck on an outer edge and a second connection piece stuck on an inner edge thereof, said first and second connection pieces each having a sticky surface toward said lenses and a pair of protrudent screw holes spacedly projected outward from outer surface thereof;

a bridge having a pair of first coupling plates respectively perpendicular to two ends each having a pair of dowel holes spacedly formed and engaged with protrudent screw holes of said second connecting pieces and secured by screws;

a pair of L-shaped temples each having a coupling plate perpendicular to the end of transverse portion thereof and each having a pair of dowel holes spacedly formed and engaged with the protrudent screw holes of said first connection pieces and secured by screws;

whereby, said connection pieces are removable and adjustable to correct the focus and the horizontal line to fit the eyes and the face of a wearer.

2. An improved structure of the rimless eyeglasses comprising:

a pair of lenses each having a first connection piece and a second connection piece respectively stuck on an outer edge and an inner edge, said connection pieces each having a sticky surface toward said lenses and a single protrudent screw hole projected outward from a lower portion thereof;

an inverse U-shaped bridge having a dowel hole in each of its upright portions engaged with the protrudent screw holes of said second connection pieces and secured by screws;

a pair of L-shaped temples each having a coupling plate perpendicular to the end of its transverse portions, said coupling plates each having a dowel hole in a lower portion thereof engaged with the protrudent screw holes and secured by screws;

whereby, said connection pieces are removable and adjustable to correct the focus and the horizontal line to fit the eyes and the face of a wearer.

3. An improved structure of the rimless eyeglasses comprising:

a pair of lenses each having a first and a second connection pieces respectively stuck on an outer edge and an inner edge, said connection pieces each having a sticky surface toward said lenses and a pair of protrudent through holes spacedly formed on outer surface;

a bridge having a pair of coupling plates perpendicular to two ends respectively and each having a pair of dowel holes spacedly formed and engaged with the protrudent through holes of said second connection pieces and secured by a pair of first U-shaped detents;

a pair of L-shaped temples each having a coupling plate perpendicular to the end of its transverse portions and each of said coupling plates having a pair of dowel holes spacedly formed and engaged with the protrudent through holes of said first connection pieces and second by a pair of second U-shaped detents;

whereby, said connection pieces are removable and adjustable to correct the focus and the horizontal line to fit the eyes and the face of a wearer.

4. An improved structure of the rimless eyeglasses comprising:

a pair of lenses;

a bridge having a pair of first connection pieces perpendicular to two ends stuck on an inner edge of said lenses, said first connection pieces each having sticky surface toward said lenses;

a pair of L-shaped temples each having a second connection piece stuck on outer edge of said lenses and each having a sticky surface toward said lenses;

whereby, said connection pieces are removable and adjustable to correct the focus and the horizontal line to fit the eyes and the face of a wearer.

* * * * *